(12) United States Patent
Yasuda

(10) Patent No.: US 11,550,507 B2
(45) Date of Patent: Jan. 10, 2023

(54) TIMING DETECTION CIRCUIT, SEMICONDUCTOR DEVICE, AND MEMORY SYSTEM HAVING DELAY ELEMENTS IN MATRIX

(71) Applicant: Kioxia Corporation, Tokyo (JP)

(72) Inventor: Yohei Yasuda, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 66 days.

(21) Appl. No.: 17/168,692

(22) Filed: Feb. 5, 2021

(65) Prior Publication Data

US 2022/0050631 A1 Feb. 17, 2022

(30) Foreign Application Priority Data

Aug. 11, 2020 (JP) .............................. JP2020-135909

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 1/12; G06F 1/04; G06F 12/0246
See application file for complete search history.

(56) References Cited

U.S. PATENT DOCUMENTS

| | | | |
|---|---|---|---|
| 8,878,613 B2 | 11/2014 | Wang et al. | |
| 8,981,974 B2 | 3/2015 | Chaivipas et al. | |
| 9,372,503 B1* | 6/2016 | Miller | G06F 30/394 |
| 10,305,497 B2 | 5/2019 | Nakata | |
| 2004/0008064 A1* | 1/2004 | Kashiwazaki | H03L 7/0816 |
| | | | 327/158 |
| 2005/0237822 A1* | 10/2005 | Yuki | G06F 1/12 |
| | | | 365/189.05 |
| 2016/0327975 A1* | 11/2016 | Kim | G06F 1/305 |
| 2019/0081631 A1 | 3/2019 | Nakata | |
| 2019/0296724 A1 | 9/2019 | Hirashima et al. | |
| 2020/0304224 A1* | 9/2020 | Neugeboren | G06F 1/12 |

(Continued)

FOREIGN PATENT DOCUMENTS

JP 2019-050528 A 3/2019

*Primary Examiner* — Nanci N Wong
*Assistant Examiner* — Tong B. Vo
(74) *Attorney, Agent, or Firm* — Foley & Lardner LLP

(57) ABSTRACT

A timing detection circuit includes: a delay circuit in which a plurality of cascade connected delay elements are arranged in a matrix; a plurality of odd-numbered row column lines provided in each column for each set by dividing odd-numbered rows into a plurality of sets; a plurality of even-numbered row column lines provided in each column for each set by dividing even-numbered rows into a plurality of sets; a first logical operation circuit performs a logical operation on levels of the odd-numbered row column lines and outputs a first operation result to a second latch; a second logical operation circuit performs a logical operation on levels of the plurality of even-numbered row column lines and outputs a second operation result to a third latch; and a control circuit given the first operation result and controls charging of the odd-numbered and even-numbered row column lines based on the second clock.

11 Claims, 12 Drawing Sheets

(56) References Cited

U.S. PATENT DOCUMENTS

2020/0373929 A1* 11/2020 Jang .......................... H03L 7/10
2021/0165587 A1*  6/2021 Choe ................ G11C 29/50012
2021/0397753 A1* 12/2021 Hershman ............... G06F 21/72

* cited by examiner

TIMING DETECTION CIRCUIT, SEMICONDUCTOR DEVICE, AND MEMORY SYSTEM HAVING DELAY ELEMENTS IN MATRIX

CROSS-REFERENCE TO RELATED APPLICATION(S)

This application is based upon and claims the benefit of priority from Japanese Patent Application No. 2020-135909, filed on Aug. 11, 2020, the entire contents of which are incorporated herein by reference.

FIELD

Embodiments described herein relate generally to a timing detection circuit, a semiconductor device, and a memory system.

BACKGROUND

In the related art, a delay lock loop (DLL) has been adopted in various electronic devices. The DLL implements phase synchronization, and is used, for example, for phase synchronization such as clock generation of an electronic device and data transfer of a high-speed interface. The DLL enables a phase synchronization by detecting a phase difference between an input signal input to a delay control circuit and an output signal of the delay control circuit, and feeding the phase difference back to the delay control circuit.

As for such a DLL, delay elements are arranged in a matrix, and a row-by-row phase detector and a column-by-column phase detector may be shared and used for a plurality of matrix-like delay elements, and a high-speed lock DLL using a time to digital converter (TDC) may be adopted.

In such a DLL, there is a demand for improving the resolution of timing detection and increasing the detection speed.

Examples of related art include JP-A-2019-050528.

DESCRIPTION OF THE DRAWINGS

FIG. 2 is a circuit diagram illustrating a timing detection circuit constituting the semiconductor device of at least one embodiment.

FIG. 10 is an explanatory diagram illustrating a row code and a column code.

FIG. 11 is an explanatory diagram illustrating a row code and a column code.

DETAILED DESCRIPTION

At least one embodiment provides a timing detection circuit, a semiconductor device, and a memory system capable of improving the performance of timing detection.

In general, according to at least one embodiment, the timing detection circuit includes: a clock generation circuit configured to generate a first clock synchronized with a first edge of an input clock and a second clock synchronized with a second edge of the input clock; a delay circuit in which a plurality of cascade connected delay elements are arranged in a matrix, the first clock input from an input end being sequentially transmitted in the cascade connected delay elements; a plurality of first latches configured to output a first code indicating a detection result by detecting through which row of the delay circuit the first clock has passed based on the second clock; a plurality of odd-numbered row column lines provided in each column for each set by dividing odd-numbered rows into a plurality of sets, and discharged by the delay element of a column through which the first clock has passed among the delay elements belonging to each set of the odd-numbered rows; a plurality of even-numbered row column lines provided in each column for each set by dividing even-numbered rows into a plurality of sets, and discharged by the delay element of the column through which the first clock has passed among the delay elements belonging to each set of the odd-numbered rows; a first logical operation circuit configured to perform a logical operation on levels of the plurality of odd-numbered row column lines and output a first operation result; a second logical operation circuit configured to perform a logical operation on levels of the plurality of even-numbered row column lines and output a second operation result; a plurality of second latches given the first operation result and configured to detect through which delay element of column of the delay circuit in the odd-numbered row the first clock has passed based on the second clock; a plurality of third latches given the second operation result and configured to detect through which delay element of column of the delay circuit in the even-numbered row the first clock has passed based on the second clock; a plurality of selectors configured to select either an output of the second latch or an output of the third latch based on the first code to output a second code; and a control circuit configured to control charging of the plurality of odd-numbered row column lines and the plurality of even-numbered row column lines.

Hereinafter, at least one embodiment of the present disclosure will be described in detail with reference to the accompanying drawings.

Figure 1:
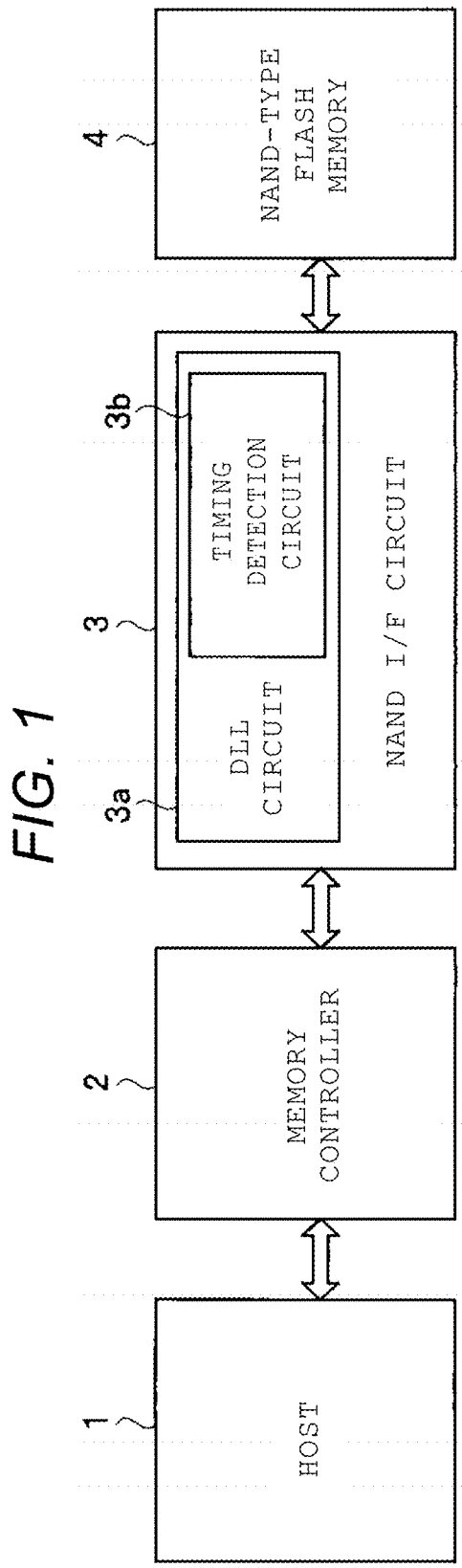
FIG. 1 is a block diagram illustrating a memory system including a semiconductor device according to at least one embodiment.
Figure 2:
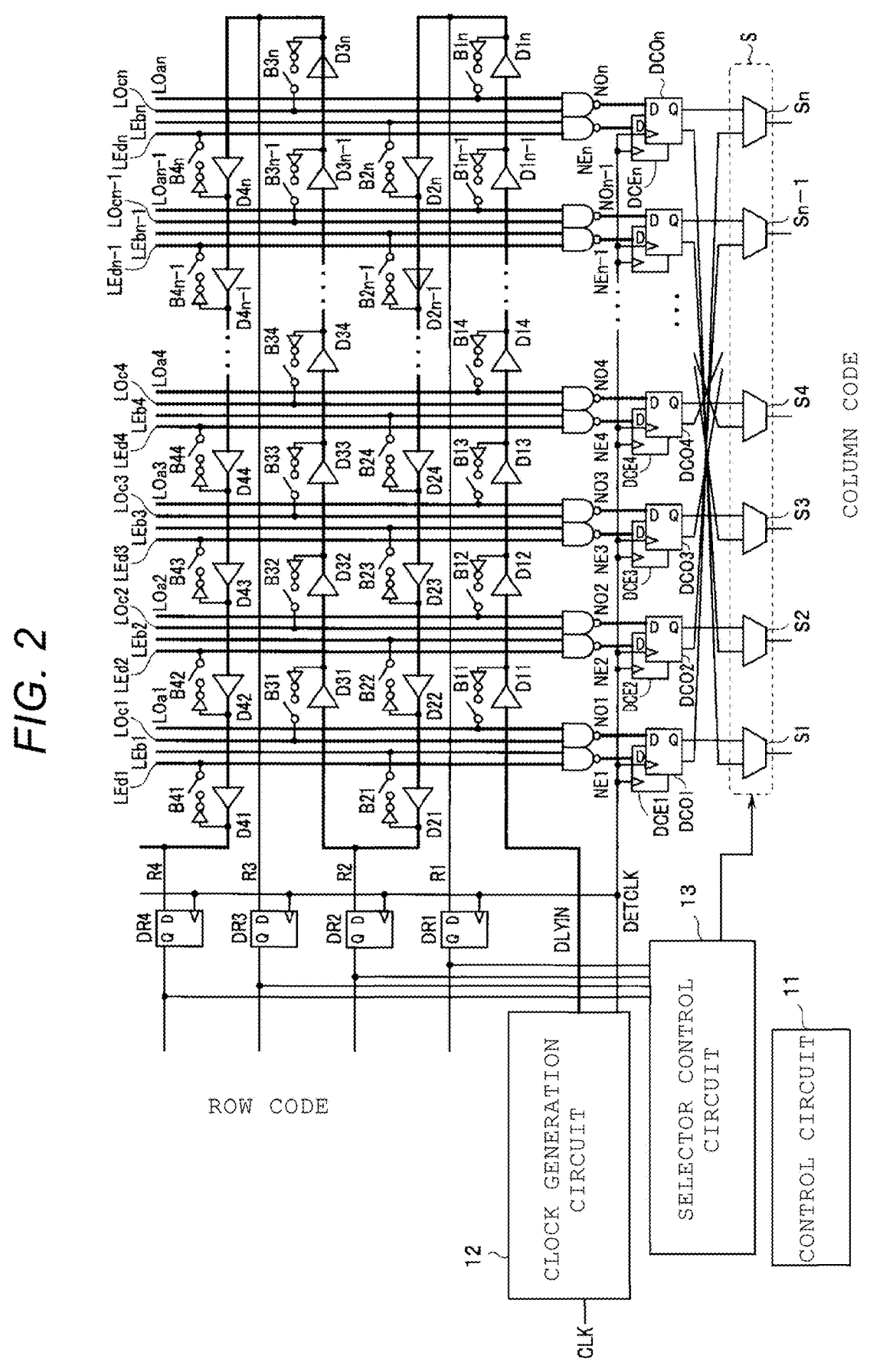

FIG. 1 is a block diagram illustrating a memory system including a semiconductor device according to at least one present embodiment. Further, FIG. 2 is a circuit diagram illustrating a timing detection circuit constituting the semiconductor device of at least one embodiment.

In at least one embodiment, it is possible to improve the resolution of timing detection by dividing the column line into multiple lines in a timing detection circuit having a configuration in which delay elements are arranged in a matrix and one row latch is shared and used for a plurality of delay elements in one row, and a column latch is shared and used for a plurality of delay elements in one column.

In at least one embodiment, descriptions will be made on an example of application to an interface circuit (NAND interface circuit) between a NAND flash memory, which is a non-volatile semiconductor storage device, and a memory controller. However, at least one embodiment is applicable to various interface circuits and is not limited to interface circuits, but is applicable to various electronic devices such as clock generation circuits, clock regeneration circuits, and communication circuits. In addition, the interface circuit may be provided on an interface chip different from the NAND flash memory and the memory controller.

For example, the timing detection circuit of at least one embodiment may detect the rising and falling timings of the clock. Thus, by giving the detection result to a replica delay constituting the DLL, it is also possible to generate an output clock synchronized with the input clock. Further, for example, at least one embodiment may also be used for a duty cycle collector that adjusts the duty ratio by using the detection result of the rising and falling timings of the clock. Alternatively, at least one embodiment may also be used as a circuit for detecting a change in the clock cycle due to a temperature change.

In the memory system of FIG. 1, the host 1 and the memory controller 2 are connected via a predetermined interface. For example, various interfaces such as a parallel interface of an embedded multi-media card (eMMC), a serial expansion interface of a peripheral component interconnect-express (PCIe), and a high-speed serial interface of M-PHY are adopted as the interface. The host 1 and the memory controller 2 have built-in interface circuits that adopt the various interfaces.

The memory controller 2 and the NAND-type flash memory 4 are connected via the NAND interface (I/F) circuit 3. Since the NAND I/F circuit 3 adopts, for example, a high-speed data transfer mode such as a toggle double data rate (ToggleDDR) and various interfaces such as an open NAND flash interface (ONFI), the NAND I/F circuit 3 transfers data between the memory controller 2 and the NAND-type flash memory 4.

The host 1 makes a write/read request to the memory controller 2. The memory controller 2 controls the writing of data to the NAND-type flash memory 4 and the reading of data from the NAND-type flash memory 4 in response to a request from the host.

The memory controller 2 and the NAND-type flash memory 4 transmit various signals such as, for example, a signal DQ <7:0> for transmitting and receiving each signal including data, a data strobe signal DQS, /DQS, a chip enable signal CE, a command latch enable signal CLE, an address latch enable signal ALE, a write enable signal/WE, a read enable signal RE, /RE, and a write protect signal WP via the NAND I/F circuit 3.

The NAND I/F circuit 3 includes a DLL circuit 3a. The DLL circuit 3a includes a timing detection circuit 3b, and the timing detection circuit 3b detects the timing of the rising edge and the falling edge of the input clock. The DLL circuit 3a may synchronize with various clocks from the memory controller 2 based on the timing detection result by the timing detection circuit 3b and may generate various clocks having a duty ratio of, for example, 50%.

The NAND I/F circuit 3 may be omitted, and the memory controller 2 and the NAND-type flash memory 4 may include an interface circuit having the same function as the NAND I/F circuit 3. At least one embodiment may be applied not only to the NAND I/F circuit 3 but also to various interface circuits built in the host 1, the memory controller 2, and the NAND-type flash memory 4.

(Configuration of Timing Detection Circuit)

Figure 3:
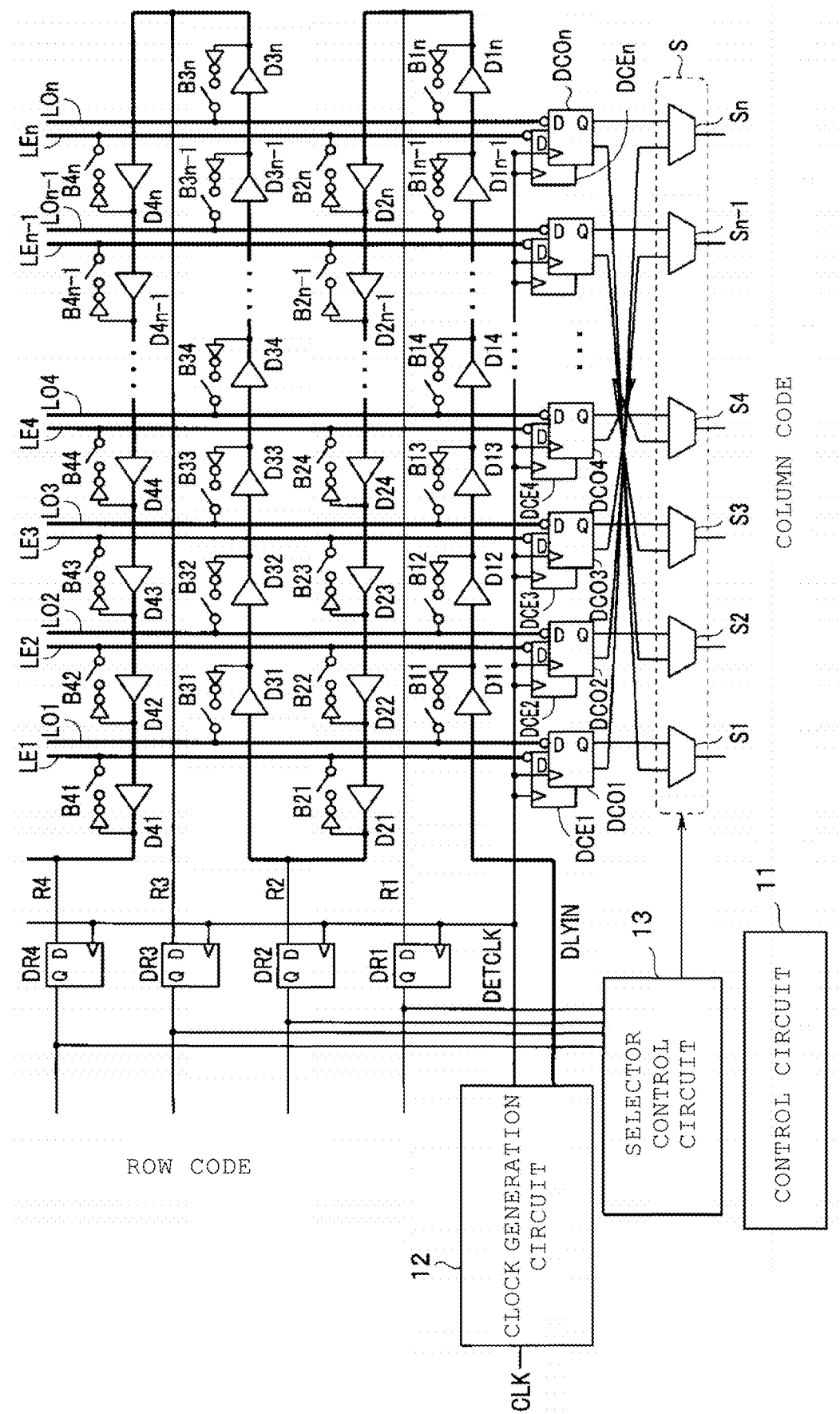
FIG. 3 is a circuit diagram illustrating a comparative example.

FIG. 2 illustrates an example of a specific configuration of the timing detection circuit 3b. Further, FIG. 3 is a circuit diagram illustrating a comparative example. In addition, in FIGS. 2 and 3, the same components are denoted by the same reference numerals, and duplicate descriptions will be omitted for the same components.

In FIGS. 2 and 3, the timing detection circuit 3b is provided with a control circuit 11 that controls the entire timing detection circuit 3b. The control circuit 11 may be implemented by a processor using a central processing unit (CPU) or a field programmable gate array (FPGA), may operate according to a program stored in a memory (not illustrated) to control each unit, or may be a hardware electronic circuit that implements a part or all of functions.

The input clock CLK is input to the clock generation circuit 12. The clock generation circuit 12 generates a clock DLYIN at the edge of the input clock CLK, and generates a clock DETCLK at the edge of the next input clock CLK. The clock DLYIN from the clock generation circuit 12 is output to the delay line indicated by the thick line.

The delay line as a delay circuit is configured such that a plurality of delay elements D11, D12, . . . , D1$n$, D2$n$, D2$n$-1, . . . , D22, D21, D31, D32, . . . are vertically connected (hereinafter, these elements are referred to as a "delay element D" when it is not necessary to distinguish them from each other), and the delay lines are folded back in a zigzag manner so that the delay elements D are arranged in a matrix.

Subscripts (1, 2, 3, . . . , m) representing the respective rows of the delay line (hereinafter, also referred to as a "row") and subscripts (1, 2, 3, . . . , n) representing the respective columns thereof (hereinafter, also referred to as a "column") indicate which row and which column each delay element D belongs to. For example, the delay element in the second row from the bottom and the third column from the left in FIGS. 2 and 3 is indicated by the subscript 23 as D23. In FIGS. 2 and 3, for a propagation detection circuit B, which will be described later, the position of the matrix to which the propagation detection circuit B belongs is indicated by a two-digit subscript. Although the delay lines are illustrated up to the fourth row in FIGS. 2 and 3, the delay lines may be set to an appropriate number of rows as needed.

FIGS. 2 and 3 represent an example having the nth column of the first to nth columns. In FIGS. 2 and 3, the delay elements D belonging to the same column are illustrated at positions shifted by one stage in the vertical direction between the odd-numbered rows and the even-numbered rows on the drawing. Further, both the row direction and the column direction are defined as odd-numbered rows, even-numbered rows, odd-numbered columns, and even-numbered columns according to the odd and even numbers of the subscripts.

The connection points between the delay elements D1$n$, D3$n$, . . . of the odd-numbered row at the portion where the delay line folds back and the delay elements D2$n$, D4$n$, . . . of the even-numbered row adjacent to each of these delay elements are connected to the row lines R1, R3, . . . , respectively. Similarly, the connection points between the delay elements D21, D41, . . . of the even-numbered row at the portion where the delay line folds back and the delay elements D31, D51, . . . of the odd-numbered row adjacent to each of these delay elements are connected to the row lines R2, R4, . . . , respectively.

In FIGS. 2 and 3, each of the row lines R1, R2, . . . (hereinafter, referred to as a "row line R" when it is not necessary to distinguish the row lines from each other) is connected to the data end D of the row latches DR1, DR2, . . . (hereinafter, referred to as a "row latch DR" when it is not necessary to distinguish the row latches from each other). The row latch DR as a first latch is given the clock DETCLK from the clock generation circuit 12, and when the clock DETCLK reaches a high level (hereinafter, referred to as "H"), the row latch DR outputs the level of the row line R connected to each data end D from an output end Q. The output of the row latch DR is supplied to the control circuit 11 as a row code which is the first code, and is also supplied to a selector control circuit 13.

In FIG. 3, each column is provided with column lines LO1, LO2, . . . , LOn for odd-numbered rows (hereinafter, referred to as a "column line LO" when it is not necessary to distinguish the column lines from each other) and column lines LE1, LE2, . . . , LEn for even-numbered rows (hereinafter, referred to as a "column line LE" when it is not necessary to distinguish the column lines from each other).

The delay elements D11, D12, . . . , D31, D32, . . . of the odd-numbered rows are connected to the column lines LO1, LO2, respectively, via propagation detection circuits B11, B12, . . . , B31, B32, . . . including an inverter and a switch. The propagation detection circuits B11, B12, . . . , B31, B32, . . . of the same column are commonly connected to the same column lines LO1, LO2, . . . .

Similarly, the delay elements D21, D22, . . . , D41, D42, . . . of the even-numbered rows are connected to the column lines LE1, LE2, . . . , respectively, via propagation detection circuits B21, B22, . . . , B41, B42, . . . including an inverter and a switch. Further, the propagation detection circuits B21, B22, . . . , B41, B42, . . . of the same column are commonly connected to the same column lines LO1, LO2, . . . .

In FIG. 3, the column lines LO1, LO2, . . . are connected to the data end D of the column latches DCO1, DCO2, . . . , respectively (hereinafter, referred to as a "column latch DCO" when it is not necessary to distinguish the column latches from each other). Further, the column lines LE1, LE2, . . . are connected to the data end D of the column latches DCE1, DCE2, . . . , respectively (hereinafter, referred to as a "column latch DCE" when it is not necessary to distinguish the column latches from each other). The clock DETCLK is given to the column latches DCO and DCE by the clock generation circuit 12. When the clock DETCLK becomes "H," the column latch DCO inverts the level of the column line LO connected to each data end D and outputs the level from the output end Q. Further, when the clock DETCLK becomes "H," the column latch DCE inverts the level of the column line LE connected to each data end D and outputs the level from the output end Q.

In FIGS. 2 and 3, the outputs of the column latches DCO1, DCO2, . . . , DCOn are supplied to the selectors S1, S2, . . . , Sn, and the outputs of the column latches DCE1, DCE2, . . . DCEn are supplied to the selectors Sn, Sn-2, . . . , S1.

A selector group S including the selectors S1, S2, . . . , Sn is controlled by the selector control circuit 13 to select the output of the column latch DCO or DCE and to output the selected output to the control circuit 11 as a column code which is the second code. The selector control circuit 13 determines whether the clock DLYIN is transmitted to the delay element D of the odd-numbered row or the delay element D of the even-numbered row by the output of the row latch DR, causes the selectors S1, S2, . . . to select the output of the column latch DCO when the clock DLYIN is transmitted to the delay element D of the odd-numbered row, and causes the selectors S1, S2, . . . to select the output of the column latch DCE when the clock DLYIN is transmitted to the delay element D of the even-numbered row.

The control circuit 11 is configured to control the switch of the propagation detection circuits B1l, B12, . . . (hereinafter, referred to as a "propagation detection circuit B" when it is not necessary to distinguish the propagation detection circuits from each other) and controls the charging of the column lines LO and LE so as to detect the edge timing generated at the clock cycle of the input clock CLK by the row code and the column code. Further, the control circuit 11 is configured to give the detection result to a replica delay (not illustrated) of the DLL circuit 3a so as to generate a clock synchronized with the input clock CLK from the DLL circuit 3a.

(Detection in Comparative Example)

Figure 4:
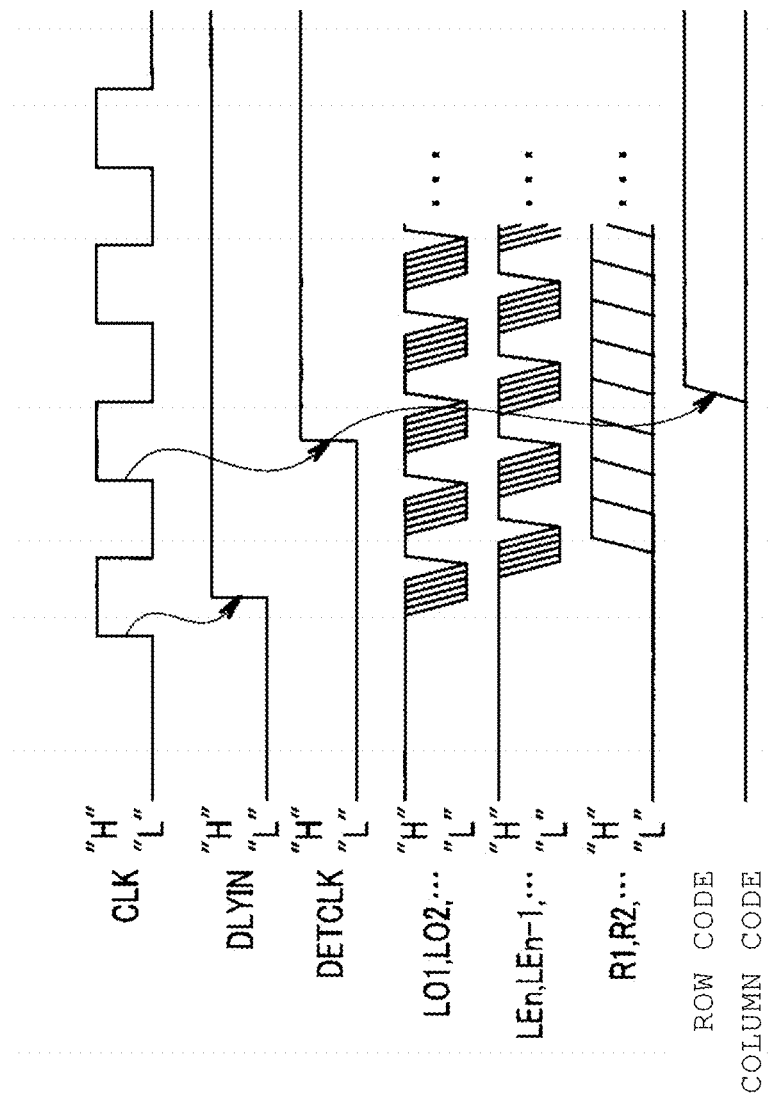
FIG. 4 is a timing chart illustrating an operation in the comparative example of FIG. 3.

FIG. 4 is a timing chart illustrating an operation in the comparative example of FIG. 3.

In the comparative example of FIG. 3, the control circuit 11 turns on the switches of the propagation detection circuits B in the first and second rows prior to the timing detection. Further, the control circuit 11 charges the column lines LO and LE to "H" (see FIG. 4). In the initial state, the output end of the delay element D is at a low level (hereinafter, referred to as "L"). The "L" output of the delay element D in the first and second rows is inverted to "H" by the inverter of each propagation detection circuit B. That is, in the initial state, the column lines LO and LE remain "H," and the inputs of the column latches DCO and DCE remain "L."

In this state, when detecting the rising edge of the input clock CLK, the clock generation circuit 12 outputs the clock DLYIN of "H" to the delay line. The clock DLYIN is transmitted to the delay line and passes through each delay element D. When the clock DLYIN passes through the delay element D, the output of the delay element D becomes "H," the inverter output of the propagation detection circuit B connected to the delay element D becomes "L," and the column lines LO and LE change from "H" to "L."

For example, when the clock DLYIN passes through the delay element D14, the column lines LO1 to LO4 are "L," and the column lines LO5 to LOn and the column lines LE1 to LEn remain "H." Further, for example, when the clock DLYIN passes through the delay element D24, the column lines LEn to LE4 are changing from "H" to "L," and the column lines LE3 to LE1 remain "H."

That is, for the odd-numbered rows, the column line LO from the first column to the column where the clock DLYIN has passed the delay element D changes from "H" to "L," and for the even-numbered rows, the column line LE from the nth column to the column where the clock DLYIN has passed through the delay element D, changes from "H" to "L." Further, when the clock DLYIN passes through the last delay element D1n in the first row, the row line R1 becomes "H," and when the clock DLYIN passes through the last delay element D21 in the second row, the row line R2 becomes "H." That is, each time the clock DLYIN passes through the delay element D in one row, the row lines R1, R2, . . . sequentially become "H."

When detecting the rising edge of the input clock CLK after generating the clock DLYIN, the clock generation circuit 12 generates the clock DETCLK of "H." The clock DETCLK is supplied to the column latches DCO and DCE and the row latch DR. When the clock DETCLK of "H" is input, the column latches DCO and DCE and the row latch DR take and output the level of the data end D.

For example, when the clock DLYIN passes up to the delay element D14 in the first row, and when the clock DETCLK is generated, the outputs of the column latches DCO1 to DCO4 become "H," and the outputs of the other column latches DCO5 to DCOn and the column latch DCE remain "L." Further, in this case, all the outputs of the row latch DR are "L," and the selector control circuit 13 causes the selectors S1 to Sn of the selector group S to select the output of the column latch DCO. In this case, a column code and a row code indicating that the time for the clock DLYIN to pass through the four delay elements D has elapsed from the generation of the clock DLYIN to the generation of the clock DETCLK are supplied to the control circuit 11.

Further, for example, when the clock DLYIN passes through the delay element D24 in the second row, and when the clock DETCLK is generated, the outputs of the column latches DCEn to DCE4 become "H," and the outputs of the column latches DCE3 to DCE1 remain "L." In this case, the output of the row latch DR1 is "H" and the output of the other row latch DR is "L." The selector control circuit 13 causes the selectors S1 to Sn of the selector group S to select the output of the column latch DCE based on the output of the row latch DR. Thus, in this case, a column code and a row code indicating that the time for the clock DLYIN to pass through the 2n–3 delay elements D has elapsed from the generation of the clock DLYIN to the generation of the clock DETCLK are supplied to the control circuit 11.

The timing detection of FIGS. 2 and 3 adopts a method of detecting in which column the clock DLYIN has reached the delay element D by detecting that the column lines LO and LE are discharged and changed to "L." The column lines LO and LE change from "H" to "L" when the clock DLYIN passes through the delay element D. Therefore, after the column lines LO and LE are discharged by the clock DLYIN passing through all the delay elements D in each row, the column lines LO and LE need to be recharged to "H" in order to detect the passage of the clock DLYIN in the next row. In the comparative example of FIG. 3, in order to secure a sufficient period for recharging the discharged column lines LO and LE (hereinafter, referred to as a "recovery period"), timing detection is performed using other column lines LO and LE for the odd-numbered rows and the even-numbered rows.

That is, as illustrated in FIG. 4, when the clock DETCLK passes through the delay element D1n in the first row and the row line R1 becomes "H," the control circuit 11 recharges the column line LO, which becomes "L," to "H." When the clock DETCLK passes through the delay element D21 in the second row and the row line R2 becomes "H," the control circuit 11 recharges the column line LE, which becomes "L," to "H." Similarly, the control circuit 11 then recharges the column line LO to "H" every time the clock DLYIN passes through all the delay elements D in the odd-numbered rows, and recharges the column line LE to "H" every time the clock DLYIN passes through all the delay elements D in the even-numbered rows. That is, in the comparative example of FIG. 3, the time for the clock DLYIN to pass through the delay element D for about two rows is provided as the recovery period.

When the clock DETCLK passes through the delay element Din in the first row, the control circuit 11 turns off the switch of the propagation detection circuit B in the first row and turns on the switch of the propagation detection circuit B in the third row. Further, when the clock DETCLK passes through the delay element D21 in the second row, the control circuit 11 turns off the switch of the propagation detection circuit B in the second row and turns on the switch of the propagation detection circuit B in the fourth row. Thereafter, similarly, every time the clock DLYIN passes through all the delay elements D in the mth row, the control circuit 11 turns off the switch of the propagation detection circuit B in the mth row and turns on the switch of the propagation detection circuit B in the m+2nd row.

(Problems of Comparative Example)

In the comparative example, there is a problem that it is difficult to increase the resolution when converting the clock cycle into a digital code. The resolution of the timing detection circuit of FIG. 3 is defined by the delay time of one stage of the delay element D. Therefore, when trying to improve the resolution, it is necessary to shorten the delay time of the delay element D. When the delay time of the delay element D is shortened, the time for the clock DLYIN to pass through the delay element D in one row, that is, the discharge time of the column lines LO and LE, is shortened. That is, in the comparative example of FIG. 3, since the column lines LE and LO are charged during the discharge period of the column lines LO and LE (see FIG. 4), the time that may be accomplished as the recovery period is shortened.

Figure 5:
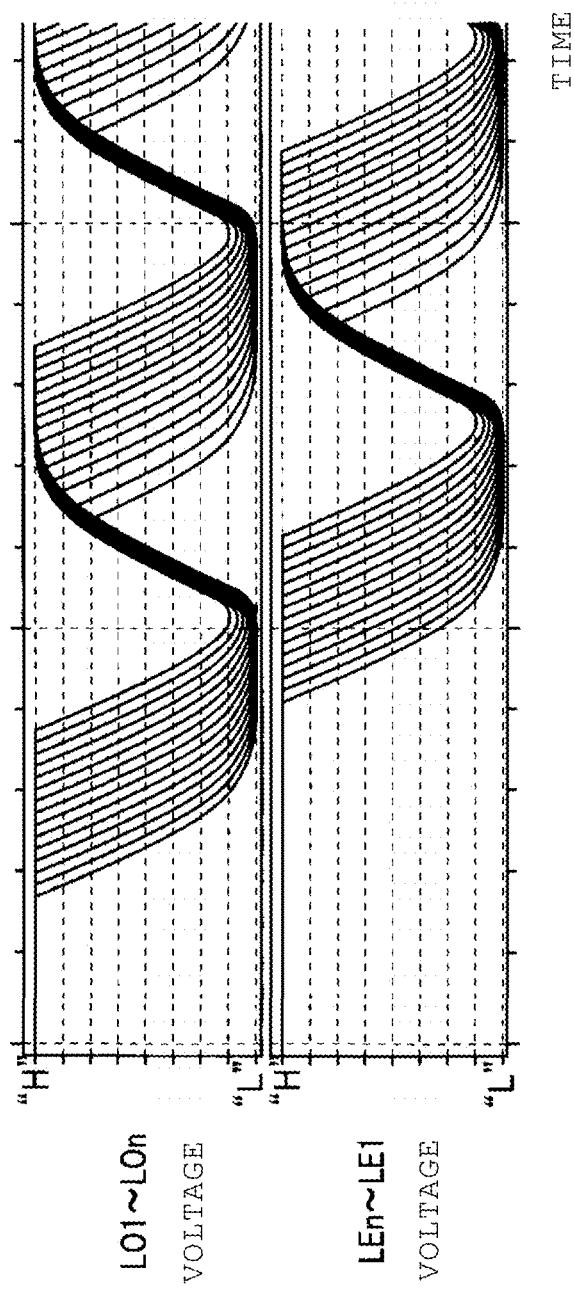
FIG. 5 is a waveform diagram illustrating a recovery period in the comparative example by taking time on the horizontal axis and taking the voltage of column lines LO1, LO2, . . . or the voltage of column lines LEn, LEn−1, . . . on the vertical axis.

FIG. 5 is a waveform diagram illustrating the recovery period in the comparative example in which the horizontal axis represents time, and the vertical axis represents the voltage of the column lines LO1, LO2, . . . or the voltage of the column lines LEn, LEn–1, . . . . The example of FIG. 5 illustrates an example in which the delay time for one stage of the delay element D is relatively shortened. The example of FIG. 5 illustrates that since the delay time of the delay element D is shortened, the recovery period is shortened, and the column exists in which the discharge is started before the charging of the column line LO and the column lien LE is completed. As a result of starting the discharge of the column lines LO and LE before being charged to a sufficient voltage, the column lines LO and LE that become "L" are generated at a relatively early timing after the clock DLYIN passes, and the accuracy of timing detection deteriorates.

In order to avoid this problem, a method of shortening the charging time by shortening the number of stages in the row direction and reducing the load capacity of the column lines LO and LE may be considered. In this case, however, the longest period in which timing may be detected is limited. Further, a method of lengthening the recovery period that may be accomplished by increasing the number of stages in the column direction may be considered, but in this case, there is a drawback that the number of column latches DCO and DCE increases.

(Configuration)

Therefore, in at least one embodiment, the above problem is solved by dividing the column line into multiple lines.

In FIG. 2, the configuration of the delay line and the delay element D, and the configuration of the propagation detection circuit B connected to the output end of each delay element D are the same as in the comparative example of FIG. 3. Further, in FIG. 2, the configurations of the control circuit 11, the clock generation circuit 12, the selector control circuit 13, the row latch DR, the column latches DCO and DCE, and the selector group S are the same as those in the comparative example of FIG. 3.

As illustrated in FIG. 2, at least one embodiment is different from the comparative example of FIG. 3 in that each column line is divided into two, and NAND circuits NO1, NO2, . . . , NOn (hereinafter, referred to as a "NAND circuit NO" when it is not necessary to distinguish these NAND circuits from each other) are added as a first logical operation circuit, and NAND circuits NE1, NE2, . . . , NEn (hereinafter, referred to as a "NAND circuit NE" when it is not necessary to distinguish these NAND circuits from each other) are added as a second logical operation circuit.

That is, in at least one embodiment, the odd-numbered rows are divided into a plurality of sets (i.e., two in FIG. 2), and the column lines corresponding to the respective sets are arranged in each column by the number of sets. Further, the even-numbered rows are divided into a plurality of sets (i.e., two in FIG. 2), and the column lines corresponding to the respective sets are arranged in each column by the number of sets.

For example, in FIG. 2, the column line LO corresponding to the odd-numbered rows in FIG. 3 is divided into two sets, and column lines LOa1, LOa2, . . . , LOan corresponding to the set of (4m+1) (m is an integer of 0 or more) rows (hereinafter, referred to as a "column line LOa" when it is not necessary to distinguish these column lines from each other) and column lines LOc1, LOc2, . . . , LOcn corresponding to the set of (4m+3) rows (hereinafter, referred to as a "column line LOc" when it is not necessary to distinguish these column lines from each other) are adopted.

Further, in FIG. 2, the column line LE corresponding to the even-numbered rows in FIG. 3 is divided into two sets, and column lines LEb1, LEb2, . . . , LEbn corresponding to the set of (4m+2) rows (hereinafter, referred to as a "column line LEb" when it is not necessary to distinguish these column lines from each other) and column lines LEd1, LEd2, . . . , LEdn corresponding to the set of (4m+4) rows (hereinafter, referred to as a "column line LEd" when it is not necessary to distinguish these column lines from each other) are adopted.

The column line LOa is connected to the propagation detection circuit B of the (4m+1) row and is connected to one input end of the NAND circuit NO, and the column line LOc is connected to the propagation detection circuit B of the (4m+3) row and is connected to the other input end of the NAND circuit NO.

The column line LEb is connected to the propagation detection circuit B of the (4m+2) row and is connected to one input end of the NAND circuit NE, and the column line LEd is connected to the propagation detection circuit B of the (4m+4) row and is connected to the other input end of the NAND circuit NE.

The NAND circuits NO1, NO2, . . . NOn each perform a two-input NAND operation, and supply the operation result to the data end D of the column latches DCO1, DCO2, . . . , DCON as the second latch.

Further, the NAND circuits NE1, NE2, . . . NVn each perform a two-input NAND operation, and supply the operation result to the data end D of the column latches DCE1, DCE2, . . . , DCEn as the third latch.

As described above, a configuration is made such that the levels of the column line LOa for the (4m+1) row and the column line LOc for the (4m+3) row are detected by the NAND circuit NO and the detection result is supplied to the column latch DCO, and the levels of the column line LEb for the (4m+2) row and the column line LEd for the (4m+4) row are detected by the NAND circuit NE and the detection result is supplied to the column latch DCE. Thus, even when the column line is divided with respect to the comparative example of FIG. 3, timing detection is enabled by the same number of column latches DCO and DCE as in the comparative example.

(Operation)

Figure 6:
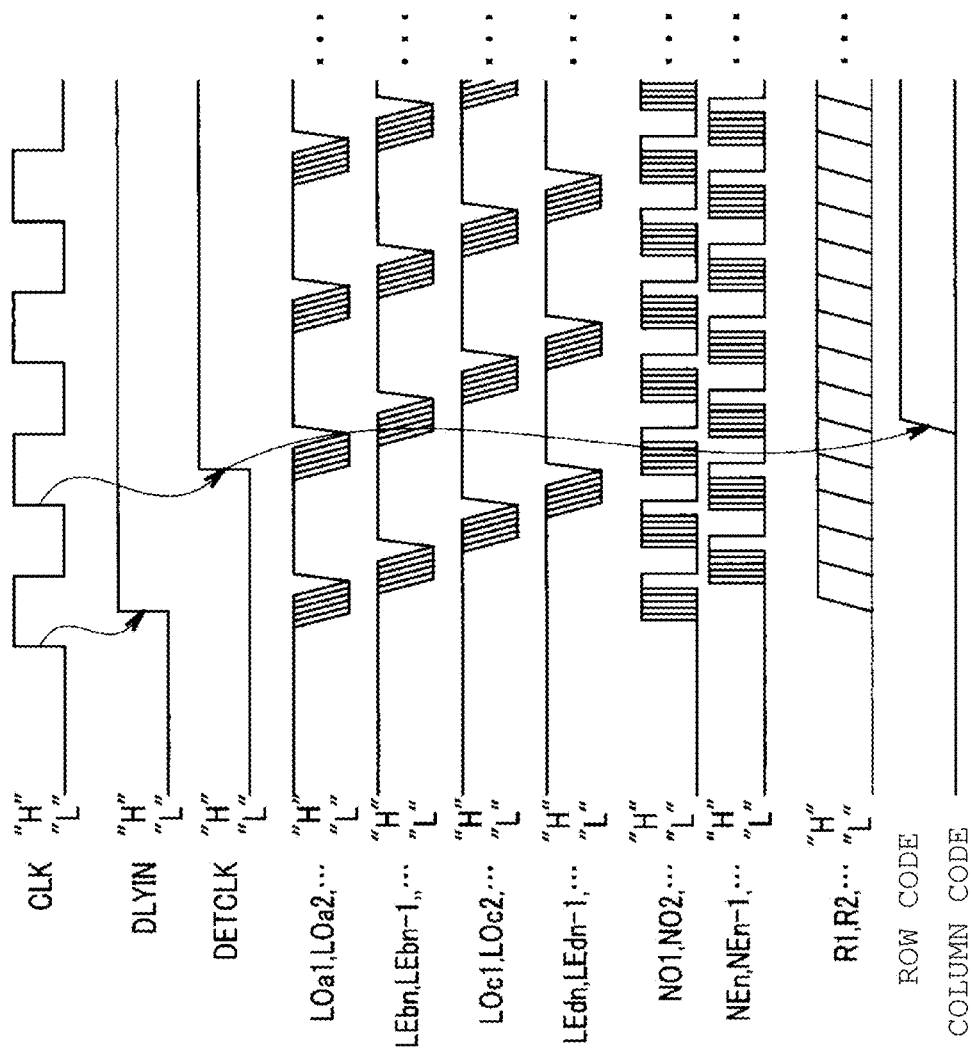
FIG. 6 is a timing chart illustrating an operation according to at least one embodiment.
Figure 7:
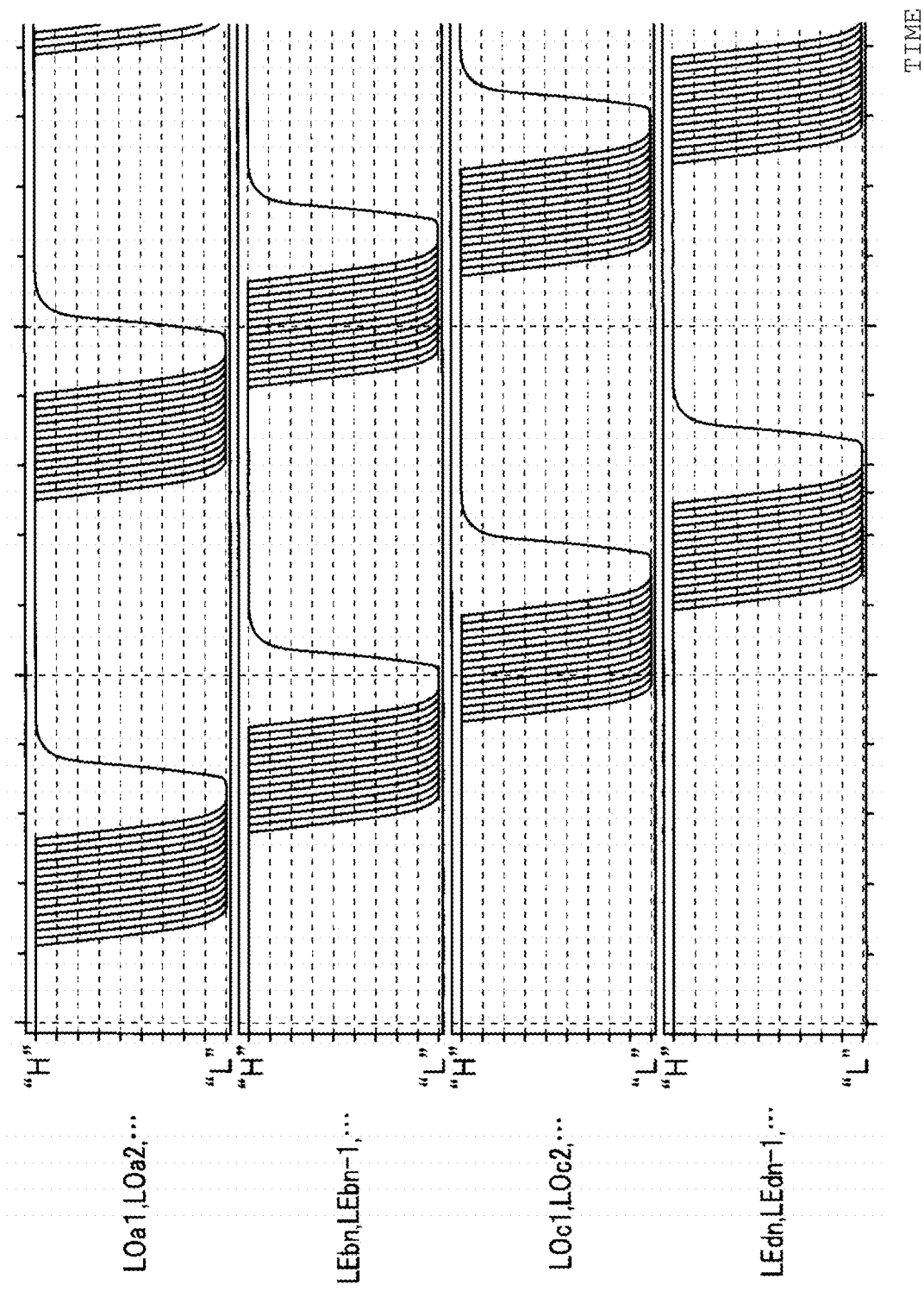
FIG. 7 is a waveform diagram illustrating a recovery period according to at least one embodiment by taking time on the horizontal axis and taking the voltage of each column line LOa, the voltage of each column line LEb, the voltage of each column line LOc, and the voltage of each column line LEd on the vertical axis.

Next, the operation of at least one embodiment configured in this way will be described with reference to FIGS. 6 and 7. FIG. 6 is a timing chart illustrating an operation according to at least one embodiment. Further, FIG. 7 is a waveform diagram illustrating the operation of a recovery period in which the horizontal axis represents time, and the vertical axis represents the voltage of each column line LOa, the voltage of each column line LEb, the voltage of each column line LOc, and the voltage of each column line LEd.

The control circuit 11 turns on each switch of the propagation detection circuit B from the first to fourth rows in the initial state before the input clock CLK is input to the clock generation circuit 12. Further, the control circuit 11 charges the column lines LOa, LOc, LEb, and LEd to "H" (see FIG. 6). In the initial state, the output end of the delay element D is "L." The "L" output of each delay element D in the first to fourth rows is inverted to "H" by the inverter of each propagation detection circuit B. That is, in the initial state, the column lines LOa, LOc, LEb, and LEd remain "H." Therefore, in the initial state, all the inputs of the NAND circuits NO and NE are "H," and "L" is applied to the data end D of the column latches DCO and DCE.

The control circuit 11 supplies the input clock CLK to the clock generation circuit 12. When detecting the rising edge of the input clock CLK, the clock generation circuit 12 outputs the clock DLYIN of "H" to the delay line. The clock DLYIN is transmitted to the delay line and passes through each delay element D. When the clock DLYIN passes through the delay element D, the output of the delay element D becomes "H," the inverter output of the propagation detection circuit B connected to the delay element D becomes "L," and the column lines LOa, LOc, LEb, and LED are changed from "H" to "L."

For example, when the clock DLYIN passes through the delay element D14, the column lines LOa1 to LOa4 change from "H" to "L," and the column lines LOa5 to LOan and the column lines LEb, LOc, and LEd remain "H." Therefore, at this point in time, the outputs of the NAND circuits NO1 to NO4 are "H," and the outputs of the NAND circuits NO5 to NOn are "L." Further, for example, when the clock DLYIN passes through the delay element D24, the column lines LEbn to LEb4 change from "H" to "L," and the column lines LEb3 to LEb1 remain "H." Therefore, at this point in time, the outputs of the NAND circuits NEn to NE4 are "H," and the outputs of the NAND circuits NE3 to NE1 are "L."

Further, when the clock DLYIN passes through the last delay element D1n in the first row, the row line R1 becomes "H", and when the clock DLYIN passes through the last delay element D21 in the second row, the row line R2 becomes "H." That is, each time the clock DLYIN passes through the delay element D in one row, the row lines R1, R2, . . . sequentially become "H."

The control circuit 11 recharges the column line after the clock DLYIN has passed from "L" to "H" based on the change of the row line R (not illustrated). That is, when the clock DLYIN passes through the delay element D1n, the row line R1 becomes "H," and the control circuit 11 recharges the entire column line LOa from "L" to "H" based on the change in the row line R1. Similarly, every time the row lines R2, R3, . . . become "H" due to the passage of the clock DLYIN, the control circuit 11 sequentially recharges the column lines LEb, LOc, and LEd.

For example, when the clock DLYIN passes through the delay element D34, the column lines LOc1 to LOc4 change from "H" to "L," and the column lines LOc5 to LOcn remain "H." Therefore, at this point in time, the outputs of the NAND circuits NO1 to NO4 are "H," and the outputs of the NAND circuits NO5 to NOn are "L." Further, for example, when the clock DLYIN passes through the delay element D44, the column lines LEdn to LEd4 change from "H" to "L," and the column lines LEd3 to LEd1 remain "H." Therefore, at this point in time, the outputs of the NAND circuits NEn to NE4 are "H," and the outputs of the NAND circuits NE3 to NE1 are "L."

When the clock DLYIN passes through the delay lines of the first to fourth rows and reaches the delay element D of the fifth row, the column lines LOa1, LOa2, . . . are sequentially changed to "H" according to the passage of the delay element D of the clock DLYIN. When the clock DLYIN reaches the delay element D in the sixth row, the column lines LEbn, LEbn−1, . . . are sequentially changed from "H" to "L" according to the passage of the delay element D of the clock DLYIN. Thereafter, the same operation is performed.

That is, for the (4m+1) odd-numbered row, the column line LOa from the first column to the column where the clock DLYIN has passed through the delay element D changes from "H" to "L." For the (4m+3) odd-numbered row, the column line LOc from the first column to the column where the clock DLYIN has passed through the delay element D changes from "H" to "L." For the (4m+2) even-numbered row, the column line LEb from the nth column to the column where the clock DLYIN has passed through the delay element D changes from "H" to "L." For the (4m+4) even-numbered row, the column LEd from the nth column to the column where the clock DLYIN has passed the delay element D changes from "H" to "L."

When detecting the rising edge of the input clock CLK after generating the clock DLYIN, the clock generation circuit 12 generates the clock DETCLK of "H." The clock DETCLK is supplied to the column latches DCO and DCE and the row latch DR. When the clock DETCLK of "H" is input, the column latches DCO and DCE and the row latch DR take and output the level of the data end D.

For example, when the clock DETCLK is generated when the clock DLYIN passes to the delay element D14 in the first row, the column latch DCO takes and outputs the output of the NAND circuit NO, and the column latch DCE takes and outputs the output of the NAND circuit NE. At this point in time, the output of the row latch DR1 of the odd-numbered row is "L," and the selector control circuit 13 causes each selector S1, S2, . . . to select the output of NO1, NO2, . . . . Therefore, the selector group S outputs a column code in which the outputs of the selectors S1 to S4 are "H" and the outputs of the selectors S5 to Sn are "L."

The control circuit 11 acquires a column code and a row code indicating that the time for the clock DLYIN to pass through the four delay elements D has elapsed from the generation of the clock DLYIN to the generation of the clock DETCLK by the outputs of the row latch DR and the selector group S.

For example, it is assumed that the clock DETCLK is generated when the clock DLYIN passes through the delay element D24 in the second row. At this point in time, the output of the row latch DR1 of the odd-numbered row is "H," and the selector control circuit 13 causes each selector S1, S2, . . . to select the output of NE1, NE2, . . . . Therefore, the selector group S outputs a column code in which the outputs of the selectors Sn to S4 are "H" and the outputs of the selectors S3 to S1 are "L." The control circuit 11 acquires a column code and a row code indicating that the time for the clock DLYIN to pass through the (2n−3) delay elements D has elapsed from the generation of the clock DLYIN to the generation of the clock DETCLK due to the outputs of the row latch DR and the selector group S.

Thereafter, the control circuit 11 acquires, by the same operation, the column code and the row code according to the number of delay elements D through which the clock DLYIN has passed from the generation of the clock DLYIN to the generation of the clock DETCLK, as the timing detection result.

Also, at least one embodiment adopts a method of detecting in which column DLYIN has reached the delay element D by detecting that the column lines LOa, LEb, LOc, and LEd are discharged and change from "H" to "L," as in the comparative example of FIG. 3.

Also, in at least one embodiment, as in the comparative example of FIG. 3, since n column latches DCO and DCE are used for each of n columns as illustrated in FIG. 7, it is necessary to recharge each of the column lines LOa, LEb, LOc, and LED by taking the period during which the clock DLYIN has passed the delay element D for about two rows as the recovery period. In this case, in at least one embodiment, during the recovery period in which the clock DLYIN passes through the delay element D for about two rows, each of the column lines LOa, LEb, LOc, and LEd may be charged to a level at which the NAND circuits NO and NE may determine that the input end is "H."

In at least one embodiment, each of the column lines LOa, LEb, LOc, and LEd is discharged only once every time the clock DLYIN passes through the delay elements D for four rows, and after the clock DLYIN has passed through all the delay elements D of each row, recharging may be completed until a period of passing through the delay elements D for about three rows. That is, it is possible to obtain twice as much time as the comparative example of FIG. 3 as a time allowance for completing the recharging. As a result, in at least one embodiment, even when the delay time of the delay element D is shortened as compared with the comparative example without changing the number of stages in the row direction and the column direction, reliable operation is possible and the resolution of timing detection may be improved.

Further, in at least one embodiment, since the number of delay elements D connected to the column lines LO and LE, respectively, is half that of the comparative example of FIG. 3, the parasitic capacitance of the column lines LO and LE is reduced. This has the effect of achieving high-speed timing detection.

Further, in at least one embodiment, an example of dividing the column line into two sets has been described. However, by increasing the number of divisions, it is possible to increase the time allowance for completing the recharging, which may contribute to further improvement in accuracy and speed.

As described above, in at least one embodiment, a configuration is made such that the column line is divided into a plurality of sets, and the level of each divided column line is supplied to the column latch by the NAND circuit. Thus, it is possible to lengthen the charging cycle of each column line, and even when the delay time of the delay element is shortened, it is possible to improve the resolution of timing detection without shortening the longest period during which timing may be detected and without increasing the number of column latches.

Second Embodiment

Figure 8:
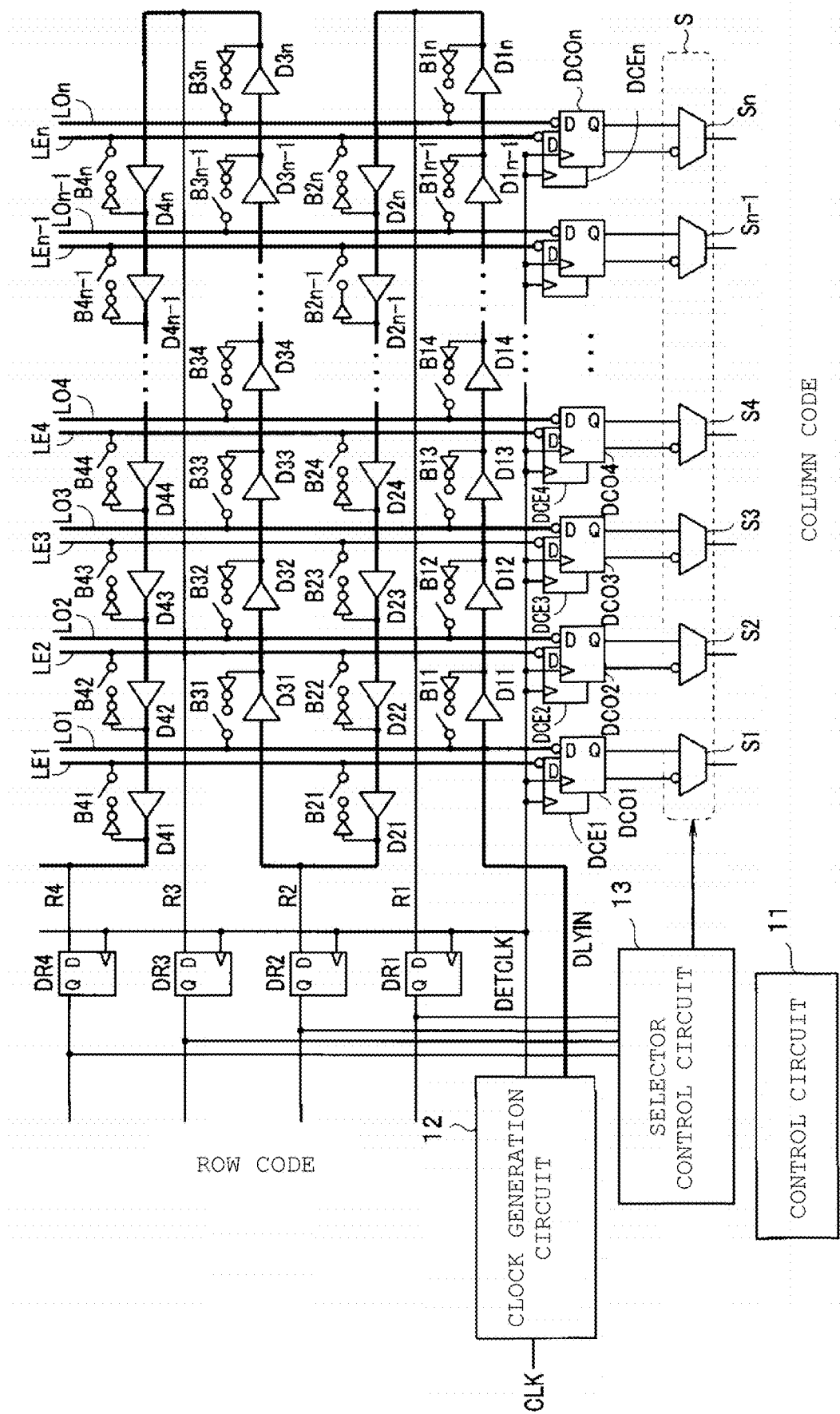
FIG. 8 is a circuit diagram illustrating a second embodiment.

FIG. 8 is a circuit diagram illustrating a second embodiment. In FIG. 8, the same components as those in FIG. 3 are denoted by the same reference numerals, and the descriptions thereof will be omitted. In at least one embodiment, the timing detection speed is increased by adopting a gray code as the column code.

In the comparative example of FIG. 3, there is also a problem that it takes a long time to determine the output row and column codes. In order to output the column code, it is necessary for the selector control circuit 13 to control the selector group S using the result after the row code is determined. However, the row latch DR requires a maximum time of about 1 ns until the row code is output by the input of the clock DETCLK. It is necessary to wait for the column code to be taken by the selectors S1, S2, . . . until the row code is output from the row latch DR. In addition to the standby time, the circuit in the subsequent stage requires a longer standby time in consideration of the metastable of the column latches DCO and DCE. As a result, the total standby time is about 2 to 3 ns. The standby time is a non-negligible amount of delay for semiconductor products that require high-speed synchronization, and it is desirable to reduce the standby time as much as possible.

As illustrated in FIG. 8, in at least one embodiment, the connection relationship between the column latches DCO and DCE and the selectors S1, S2, . . . , Sn of the selector group S is different from that of the comparative example of FIG. 3. The outputs from the output ends Q of DCO1, DCO2, . . . , DCON are supplied to one of the input ends of the selectors S1, S2, . . . , Sn, respectively. Further, the outputs from the output ends Q of DCE1, DCE2, . . . , DCEn are inverted and then supplied to the other input ends of the selectors S1, S2, . . . , Sn, respectively.

Figure 9:
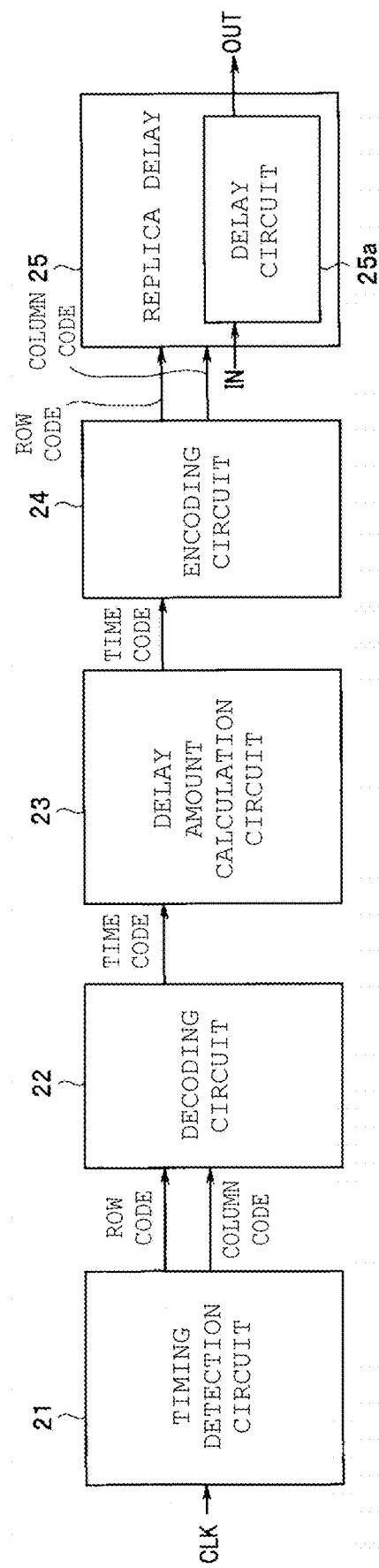
FIG. 9 is a block diagram illustrating an example of a DLL circuit which generates the output of a predetermined multiplication synchronizing with an input clock CLK by detecting the cycle of the input clock CLK using the timing detection circuit of at least one embodiment and generating a delay of a desired ratio with respect to the cycle.

FIG. 9 is a block diagram illustrating an example of an DLL circuit which generates the output of a predetermined multiplication synchronizing with an input clock CLK by detecting the cycle of the input clock CLK using the timing detection circuit of at least one embodiment and generating a delay of a desired ratio with respect to the cycle.

The timing detection circuit 21 is a timing detection circuit having the same configuration as the timing detection circuit of FIG. 8. The timing detection circuit 21 detects the interval between the rising edges of the input clock CLK (i.e., the cycle of the input clock CLK). The timing detection circuit 21 outputs a timing detection result including a row code and a column code to a decoding circuit 22 as cycle information. The decoding circuit 22 decodes the row code and the column code into a time code that directly indicates the cycle, and outputs the row code and the column code to a delay amount calculation circuit 23.

The delay amount calculation circuit 23 converts the cycle according to the input time code into a cycle having a freely selected magnification, and outputs a time code indicating the converted cycle to the encoding circuit 24. The encoding circuit 24 encodes the time code into a row code and a column code, and outputs the time code to a replica delay 25. Further, the row code and the column code are generated corresponding to the decoding process of the decoding circuit 22, and are generated by the process of inversely converting the time code generated by the decoding circuit 22 into the row code and the column code input to the decoding circuit 22. Therefore, when the conversion magnification of the cycle in the delay amount calculation circuit 23 is 1, the output of the encoding circuit 24 is the same data as the input of the decoding circuit 22.

The replica delay 25 includes a delay circuit 25a that has a delay line having the same configuration as the delay line of the timing detection circuit 21. That is, the delay circuit 25a includes delay elements D arranged in the same matrix as in FIG. 8. The replica delay 25 is configured to set the input row code and column code in the delay circuit 25a, thereby causing the input clock IN to pass through the delay elements D having the number of stages according to the row code and the column code, and be output as the output clock OUT.

With such a configuration, the DLL circuit of FIG. 9 converts the cycle detected by the timing detection circuit 21 into a cycle of the magnification set in the delay amount calculation circuit 23, converts the input clock IN into the output clock OUT of the cycle, and outputs the converted input clock IN. By adopting the input clock CLK as the input clock IN, the output clock OUT obtained by multiplying the input clock CLK by a freely selected multiple may be obtained by the DLL circuit of FIG. 9.

Figure 10:
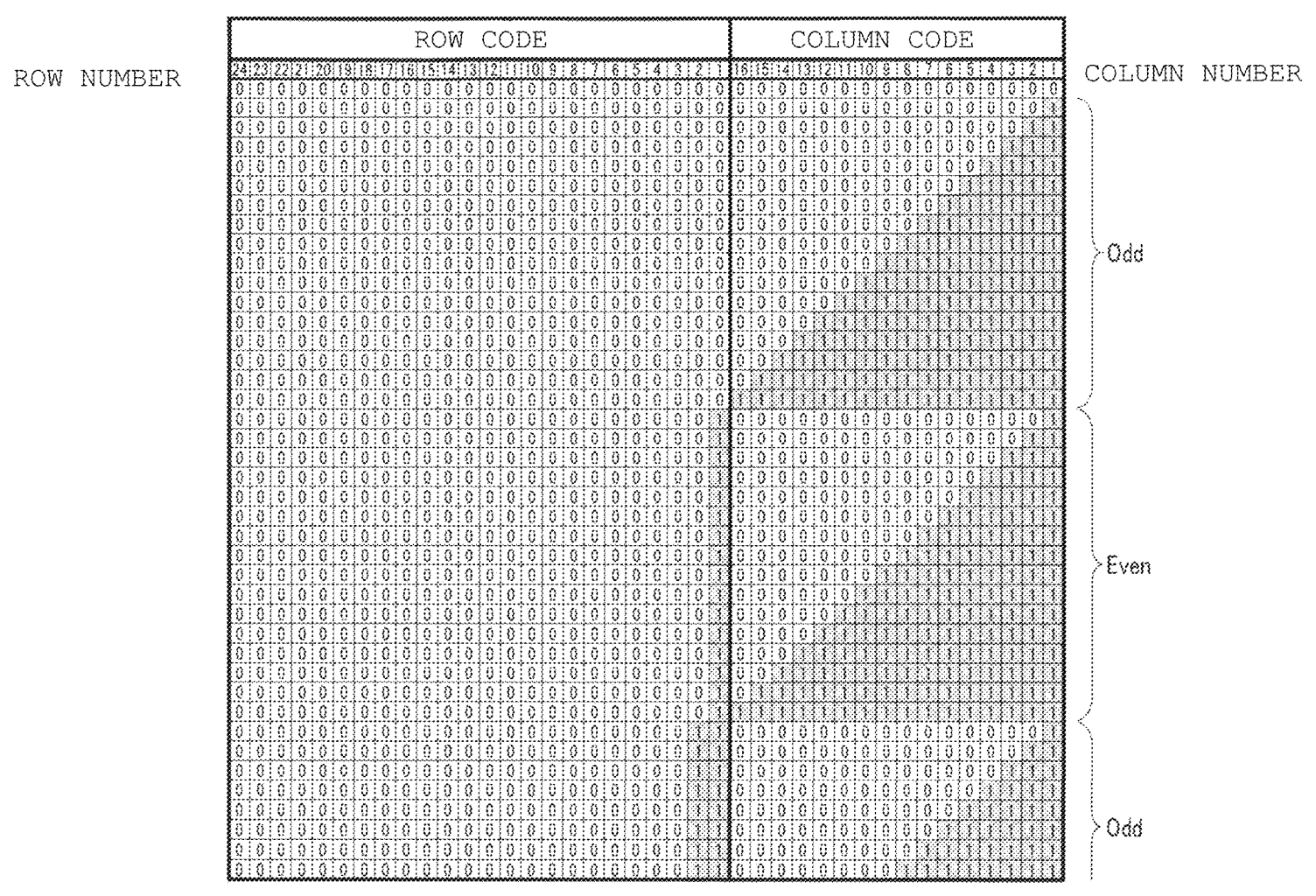
Figure 11:
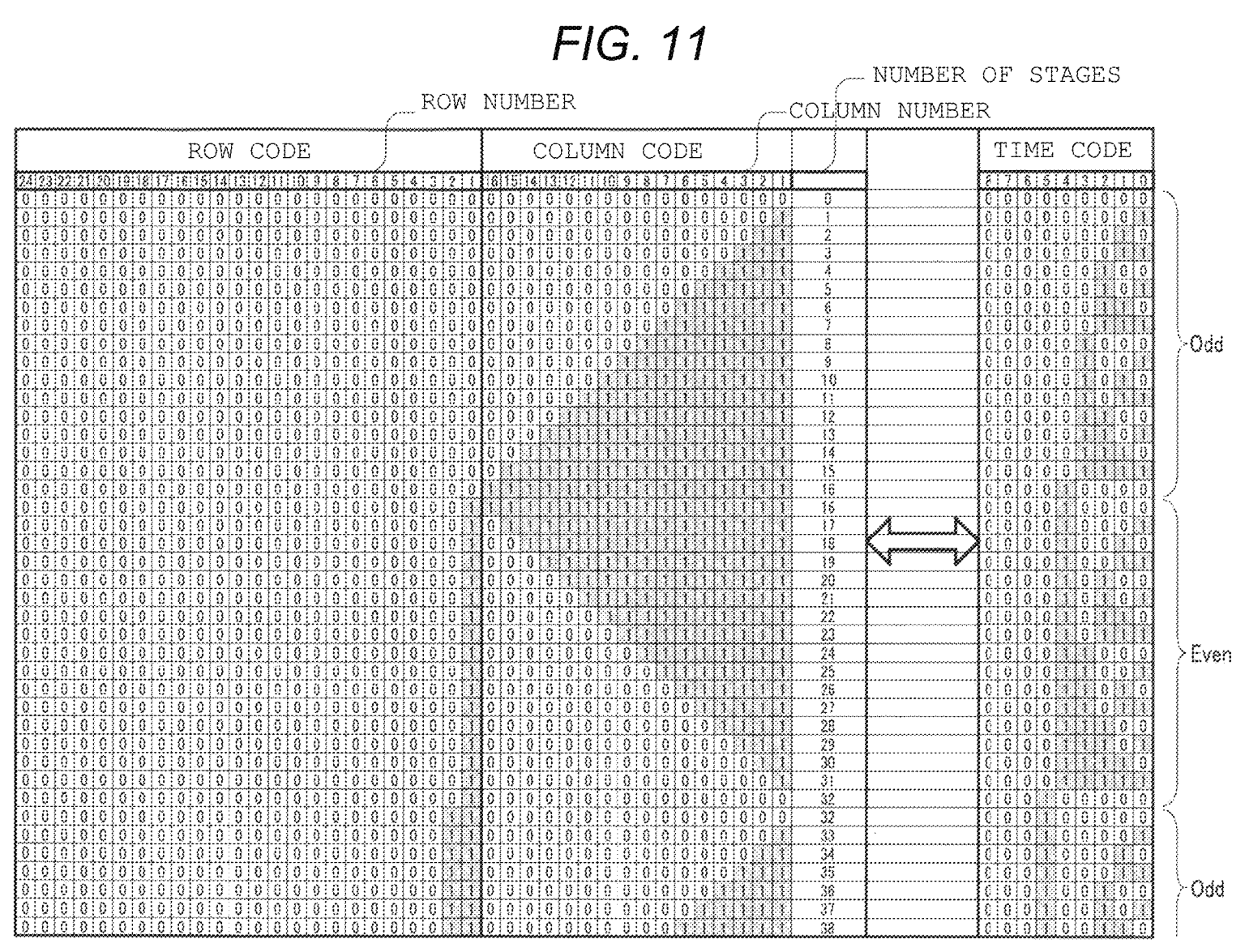

Next, the operation of at least one embodiment configured in this way will be described with reference to FIGS. 10 and 11. FIGS. 10 and 11 are explanatory diagrams illustrating a row code and a column code.

FIG. 10 illustrates a row code and a column code in the comparative example of FIG. 3. FIG. 10 illustrates an example in which a delay line in which the delay element D are arranged in the 24th row and the 16th column is adopted.

For example, in FIG. 3, assuming that the clock DETCLK is generated when the clock DLYIN passes through the delay element D of the 1st row and the 1st column, the output of the column latch DCO1 has a logical value of "1," and the outputs of the other column latches DCO2 to DCOn and the column latches DCE1 to DCEn have a logical value of "0." Therefore, all the row codes from the row latches DR1 to DR24 have a logical value of "0," and as for the column code from the selector group S, only the selector S1 has a logical value of "1," and the other selectors S2 to Sn have a logical value of "0."

Each time the delay element D which the clock DLYIN passes through increases until the clock DETCLK is generated, the selectors of the selector group S that outputs "1" are sequentially increased, and the column code from the selector group S changes as illustrated in FIG. 10. Further, each time the clock DLYIN passes through the delay elements D1n, D21, D3n, D41, . . . , the outputs of the row latches DR1 to DR24 are sequentially set to "1," and the row code changes as illustrated in FIG. 10.

In the example of FIG. 10, at the time of switching between the odd-numbered rows and the even-numbered rows, when the selector group S outputs a row code before the output of the row latch DR is switched from "0" to "1," the timing detection result given by the column code and the row code is as short as one row of the delay line. As described above, considering the delay of the output of the row latch DR, in order to output the accurate timing detection result, it is necessary to output a row code from the selector group S after the standby time of 1 ns described above, and the timing detection speed becomes lower.

FIG. 11 illustrates a row code and a column code in at least one embodiment.

In the at least one embodiment, the selector group S ignores the standby time due to the row latch DR described above and outputs a row code. In this case, for the odd-numbered rows, when the clock DLYIN passes through the delay element D at each column position excluding the column at the end of each row of the delay line, the output operation of the column code and the row code is the same as that of the comparative example of FIG. 3.

That is, in the odd-numbered rows, each time the delay element D through which the clock DLYIN passes increases until the clock DETCLK is generated, the selectors of the selector group S that outputs "1" are sequentially increased, and the column code from the selector group S changes bit by bit as illustrated in FIG. 11.

Meanwhile, in the even-numbered rows, the selector group S outputs an inverted signal of the output of the column latch DCE. Before the clock DLYIN passes through D2n, D4n, . . . , the outputs of the selectors Sn to S1 are all "1," and each time the clock DLYIN passes through the delay element D from the larger column number to the smaller column number of each column, the output changes from "1" to "0" in the order of selectors Sn, Sn−1, . . . , S1. In this way, the column code changes bit by bit as illustrated in FIG. 11 during the period when the clock DLYIN receives the even-numbered rows.

The number of stages in FIG. 11 corresponds to the number of delay elements D through which the clock DLYIN passes (hereinafter, referred to as a "number of delay stages"). The cycle of the clock from the clock generation circuit 12 is a continuous value including a number after the decimal point. The timing detection result by the timing detection circuit 21 is obtained as the number of delay stages, and the detected clock cycle is taken as a value that is an integral multiple of the delay amount for one stage. For example, even when the actual cycle is 4.3764 stages, the detected cycle is 4 stages. In this case, the maximum error from the actual cycle is ideally±0.5 stages, and the output of the timing detection circuit 21 includes the quantization error of ±0.5 stages.

In at least one embodiment, even when the column code is determined by ignoring the standby time until the row code is output, in order to maintain the accuracy of the quantization error of ±0.5 stages, the gray code is adopted, and the number of delay stages at the change timing of the outputs of the row latches DR1, DR2, . . . is set to the same number.

That is, in at least one embodiment, during the period before and after the output of each of the row latches DR1, DR2, . . . becomes "1," that is, during the period before the clock DLYIN passes through the last delay element D in each row and the first delay element D in the next row, the number of delay stages is set to the same in both the case where the outputs of the row latches DR1, DR2, . . . are "0" and the case where the outputs thereof are "1."

For example, immediately after the clock DLYIN passes through the delay element D1n, the number of delay stages is 16 when the output of the row latch DR1 is "0." Thereafter, even when the output of the row latch DR1 changes to "1," the number of delay stages is 16. Next, when the clock DLYIN passes through the first delay element D2n in the second row, the output of the selector Sn changes to "0," and the number of delay stages becomes 17.

Further, for example, immediately after the clock DLYIN passes through the delay element D21, the number of delay stages is 32 when the output of the row latch DR2 is "0." Thereafter, even when the output of the row latch DR2 changes to "1," the number of delay stages is 32. Next, when the clock DLYIN passes through the first delay element D31 in the third row, the output of the selector S1 changes to "1," and the number of delay stages becomes 33.

Since the gray code is not adopted in FIG. 10 corresponding to FIG. 3, when the column code is determined without waiting for the standby time until the output of the row latch DR transitions from "0" to "1," an error of up to 16 stages occurs. In at least one embodiment, since the gray code is adopted, the error may be minimized. Further, since the number of delay stages is set to the same number before and after the transition of the output of the row latch DR, even when the column code is determined without waiting for the standby time until the output of the row latch DR transitions from "0" to "1," the quantization error may be maintained with an accuracy of ±0.5 stages.

The right column of FIG. 11 illustrates an example of a time code corresponding to each delay stage. The decoding circuit 22 converts the row code and the column code in the left column of FIG. 11 into the time code in the right column, and the encoding circuit 24 converts the time code in the right column of FIG. 11 into the row code and the column code in the left column. Each time code has a one-to-one correspondence with the number of delay stages, and mutual conversion is possible in the decoding circuit 22 and the encoding circuit 24.

In this way, the timing detection circuit 21 determines the row code and the column code at high speed without waiting for the standby time. Even in this case, the decoding circuit 22 may generate a time code only with a quantization error of +0.5 stages. As a result, the replica delay 25 may generate the output clock OUT at high speed.

As described above, in at least one embodiment, since the gray code is adopted as the row code and the column code, and the number of delay stages is set to the same number before and after the transition of the output of the row latch, even when the column code is output before the standby time until the transition of the output of the row latch has elapsed, the quantization error may be minimized. As a result, it is possible to output the column code before the standby time, and it is possible to speed up the timing detection.

Third Embodiment

Figure 12:
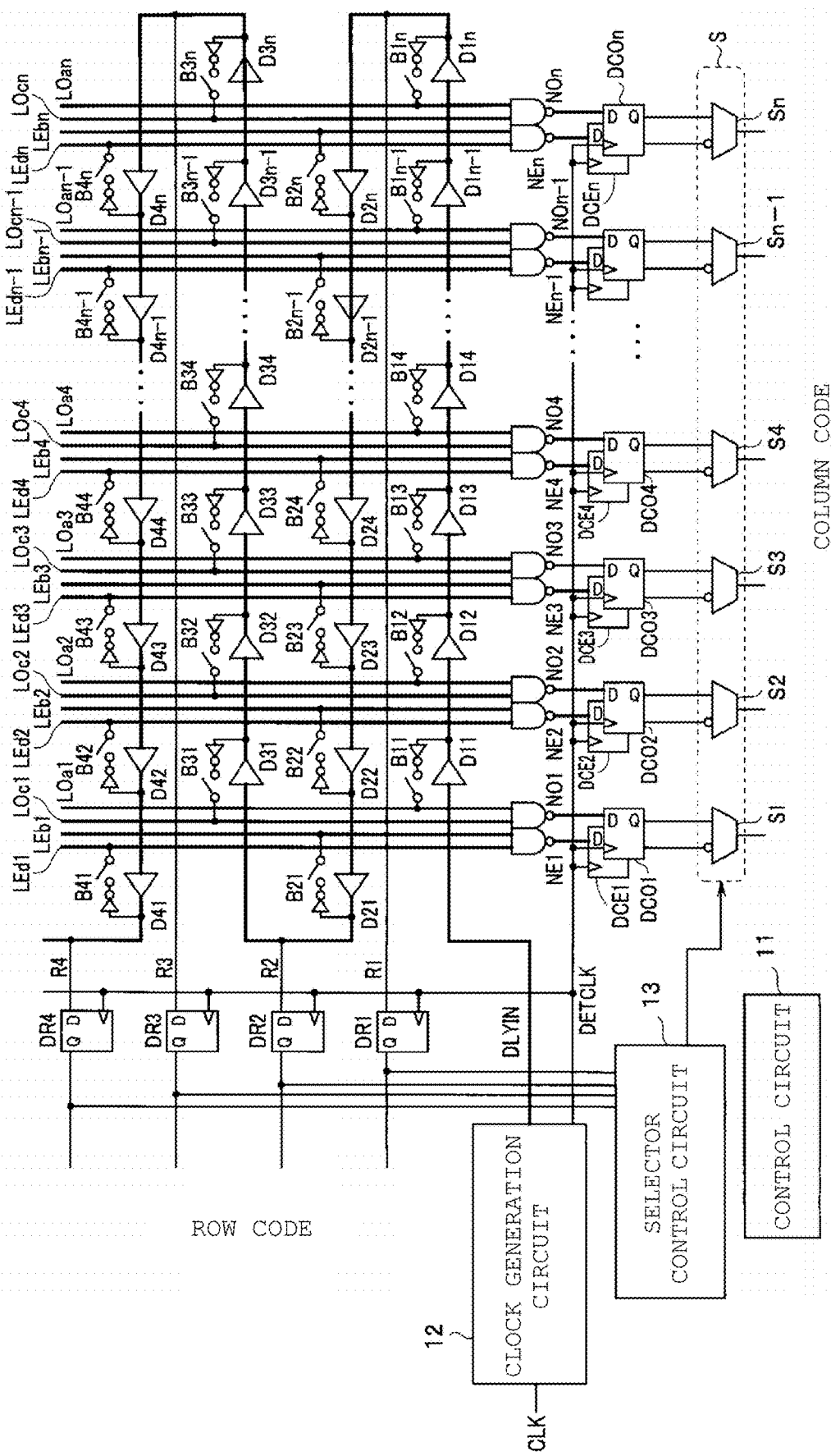
FIG. 12 is a circuit diagram illustrating a third embodiment.

FIG. 12 is a circuit diagram illustrating a third embodiment. In FIG. 12, the same components as those in FIG. 2 or 8 are denoted by the same reference numerals, and the descriptions thereof will be omitted.

In at least one embodiment, the connection relationship between the column latches DCO and DCE and the selectors S1, S2, . . . , Sn of the selector group S is different from that in FIG. 2, and the same connection as in FIG. 8 is performed, and the row code and the column code by the same gray code as in the second embodiment are adopted.

That is, in at least one embodiment, the operation until the outputs are obtained from the row latch DR and the column latches DCO and DCE is the same as that in the first embodiment of FIG. 2. Subsequent operations of the selector group S based on the control of the selector control circuit 13 and the column code output from each selector of the selector group S are the same as those of the second embodiment of FIG. 8. Also, in at least one embodiment, the relationship between the row code and the column code and the number of delay stages is the same as in FIG. 11.

Therefore, in at least one embodiment, as in the first embodiment, the charging cycle of each column line may be lengthened, and even when the delay time of the delay element is shortened, the resolution of timing detection may be improved without shortening the longest period during which timing may be detected and without increasing the number of column latches. Thus, as in the second embodiment, it is possible to speed up the timing detection while minimizing the quantization error.

As described above, in at least one embodiment, the effects of both the effect of the first embodiment and the effect of the second embodiment may be obtained.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A timing detection circuit comprising:
 a clock generation circuit configured to generate a first clock synchronized with a first edge of an input clock and to generate a second clock synchronized with a second edge of the input clock;
 a delay circuit having a plurality of cascade connected delay elements arranged in a matrix, the first clock input from an input end being sequentially transmitted in the cascade connected delay elements;
 a plurality of first latch circuits configured to output a first code that indicates a detection result by detecting which row of the delay circuit the first clock has passed through based on the second clock;
 a plurality of odd-numbered conducting row column lines including a column of each set among a plurality of sets provided by dividing odd-numbered rows, the odd-numbered conducting row column lines discharged by the delay element of a column through which the first clock has passed among the delay elements belonging to each set of the odd-numbered rows;
 a plurality of even-numbered conducting row column lines including a column of each set among a plurality of sets provided by dividing even-numbered rows, and the plurality of even-numbered conducting row column lines discharged by the delay element of the column through which the first clock has passed among the delay elements belonging to each set of the even-numbered rows;
 a first logical operation circuit configured to perform a logical operation on levels of the plurality of odd-numbered conducting row column lines and to output a first operation result;
 a second logical operation circuit configured to perform a logical operation on levels of the plurality of even-numbered conducting row column lines and to output a second operation result;
 a plurality of second latch circuits given the first operation result and configured to detect which of the delay elements of the column of the delay circuit in one of the odd-numbered rows the first clock has passed through based on the second clock;
 a plurality of third latch circuits given the second operation result and configured to detect which of the delay elements of the column of the delay circuit in one of the even-numbered rows the first clock has passed through based on the second clock;
 a plurality of selector circuits configured to select either an output of one of the second latch circuits or an output of one of the third latch circuits based on the first code and to output a second code; and
 a control circuit configured to control charging of the plurality of odd-numbered conducting row column lines and the plurality of even-numbered conducting row column lines.

2. The timing detection circuit according to claim 1, wherein the control circuit is configured to charge the odd-numbered conducting row column lines at a cycle based on a time for the first clock to pass through the delay element in one row and a number of the sets of the odd-numbered conducting row column lines, and to charge the odd-numbered conducting row column lines at a cycle based on the time for the first clock to pass through the delay element in one row and a number of the sets of the even-numbered conducting row column lines.

3. A timing detection circuit according to claim 1, wherein the second code changes by only one bit each time the first clock passes through the delay elements.

4. A semiconductor device comprising:
 the timing detection circuit according to claim 3;
 a decoding circuit configured to generate a time code according to a number of stages of a delay element through which a first clock has passed based on a first code and a second code;
 a delay amount calculation circuit configured to obtain a delay amount based on the time code and to output a time code corresponding to the delay amount;
 an encoding circuit configured to convert the time code output by the delay amount calculation circuit into the first code and the second code; and
 a replica delay circuit configured to convert an input clock into a clock of a cycle corresponding to the delay amount and to output the input clock based on an output of the encoding circuit.

5. A memory system comprising:
 a memory;
 a controller configured to control the memory; and
 an interface circuit provided with the timing detection circuit according to claim 3 and configured to control communication between the memory and the controller.

6. A semiconductor device comprising:
 the timing detection circuit according to claim 1;
 a decoding circuit configured to generate a time code according to a number of stages of a delay element through which a first clock has passed based on a first code and a second code;
 a delay amount calculation circuit configured to obtain a delay amount based on the time code and to output a time code corresponding to the delay amount;
 an encoding circuit configured to convert the time code output by the delay amount calculation circuit into the first code and the second code; and
 a replica delay circuit configured to convert an input clock into a clock of a cycle corresponding to the delay amount and to output the input clock based on an output of the encoding circuit.

7. A memory system comprising:
 a memory;
 a controller configured to control the memory; and
 an interface circuit provided with the timing detection circuit according to claim 1 and configured to control communication between the memory and the controller.

8. A timing detection circuit comprising:
 a clock generation circuit configured to generate a first clock synchronized with a first edge of an input clock and to generate a second clock synchronized with a second edge of the input clock;

a delay circuit in which a plurality of cascade connected delay elements are arranged in a matrix, the first clock input from an input end being sequentially transmitted in the cascade connected delay elements;

a plurality of first latch circuits configured to output a first code indicating a detection result by detecting which row of the delay circuit the first clock has passed through based on the second clock;

a plurality of odd-numbered conducting row column lines each provided in each column, and discharged by the delay element of a column through which the first clock has passed among the delay elements belonging to odd-numbered rows;

a plurality of even-numbered conducting row column lines each provided in each column, and configured to be discharged by the delay element of the column through which the first clock has passed among the delay elements belonging to the odd-numbered rows;

a plurality of second latch circuits configured to take a level of the odd-numbered conducting row column lines based on the second clock and to detect which of the delay elements of the column of the delay circuit in the odd-numbered row the first clock has passed through;

a plurality of third latch circuits configured to take a level of the even-numbered conducting row column lines based on the second clock and to detect which of the delay elements of the column of the delay circuit in the even-numbered row the first clock has passed through;

a control circuit configured to control charging of the plurality of odd-numbered conducting row column lines and the plurality of even-numbered conducting row column lines; and a plurality of selector circuits configured to select either an output of one of the second latch circuits or an output of one of the third latch circuits based on the first code to output a second code that changes by only one bit each time the first clock passes through the delay element of the column of the delay circuit in one of the odd-numbered rows or in one of the even-numbered rows.

9. The timing detection circuit according to claim 8, further comprising:

a decoding circuit configured to generate a time code according to a number of stages of the delay elements through which the first clock has passed, based on the first code and the second code, wherein the decoding circuit is configured to generate a same time code before and after a change of the first code.

10. A semiconductor device comprising:

the timing detection circuit according to claim 8;

a decoding circuit configured to generate a time code according to a number of stages of a delay element through which a first clock has passed based on a first code and a second code;

a delay amount calculation circuit configured to obtain a delay amount based on the time code and to output a time code corresponding to the delay amount;

an encoding circuit configured to convert the time code output by the delay amount calculation circuit into the first code and the second code; and a replica delay circuit configured to convert an input clock into a clock of a cycle corresponding to the delay amount and to output the input clock based on an output of the encoding circuit.

11. A memory system comprising:

a memory;

a controller configured to control the memory; and an interface circuit provided with the timing detection circuit according to claim 8 and configured to control communication between the memory and the controller.

* * * * *